United States Patent [19]

Maynard et al.

[11] 4,415,996
[45] Nov. 15, 1983

[54] NONWAVELENGTH-LIMITED HOLOGRAPHIC SOUND FIELD RECONSTRUCTION

[75] Inventors: Julian D. Maynard, Boalsburg; Earl G. Williams, State College, both of Pa.

[73] Assignee: The United States of America as represented by the Secretary of the Navy, Washington, D.C.

[21] Appl. No.: 271,871

[22] Filed: Jun. 9, 1981

[51] Int. Cl.³ .............................................. G03H 3/00
[52] U.S. Cl. ........................................ 367/8; 367/11; 367/13
[58] Field of Search ................. 367/8, 11, 13; 181/0.5

[56] References Cited
U.S. PATENT DOCUMENTS

| | | | |
|---|---|---|---|
| 3,364,461 | 1/1968 | Trott | 340/6 |
| 3,410,363 | 11/1968 | Schwartz | 367/8 X |
| 3,789,354 | 1/1974 | Sternberg et al. | 367/8 |
| 4,119,940 | 10/1978 | Keating et al. | 367/8 |

OTHER PUBLICATIONS

Mano et al., 1977 Ultrasonics Sym. Proc., IEEE Cat. #77CH1264–1SU, Oct. 1977, pp. 272–277.
Sasaki et al., IEEE Trans. Sonics & Ultrasonics, vol. SU-24, No. 3, May 1977, pp. 193–200.

Primary Examiner—Richard A. Farley
Attorney, Agent, or Firm—Richard S. Sciascia; Harvey A. David

[57] ABSTRACT

A method and apparatus are described for holographically generating visual representations of acoustical characteristics of sound sources. A planar array has a lattice of microphone receiving points are disposed such that evanescent wave energy from the sources is detected along with propagating wave energy. The microphone outputs are sampled, resolved into phase and amplitude components, digitized and subjected to fast Fourier transform operations to provide computer graphic display means with holographic reconstruction parameters corresponding to the sources under analysis.

13 Claims, 9 Drawing Figures

NONWAVELENGTH-LIMITED HOLOGRAPHIC SOUND FIELD RECONSTRUCTION

BACKGROUND OF THE INVENTION

This invention relates generally to measurements of the radiation properties of an acoustic source, and more particularly to apparatus and methods for holographically reconstructing images of complex acoustic sources.

An important area of acoustics is the study of radiation of sound into a medium (air or water) by a complex vibrator. Research in this area is important in military applications such as tactical quieting of military equipment, especially naval vessels, and passive and active sonar detection of enemy vessels; and the area is important in civil and industrial applications such as environmental noise abatement, and loudspeaker and musical instrument design. This area is also relevant to related fields such as electromagnetic radiation (antenna design) and hydrodynamics (flow-noise research). The fundamental objective in this research area is to correlate properties of the vibrator, such as structural features or vibrational modes, with the properties of the radiated sound, such as the farfield radiation pattern, the source vector intensity field, etc. Because of the complex nature of actual sound sources, the measurement of all the relevant properties using customary techniques is extremely involved (especially in the case of intensity measurements), with the result that thorough and time-efficient measurements are all but impossible.

There have existed a number of measurement methods which provide diverse information about the radiation of sound from sources. These are generally concerned with providing one of the following characteristics of the sound field: farfield directivity, nearfield vector intensity, surface velocity (as for a vibrating plate), and total sound power. To measure the farfield directivity, a microphone in the farfield is passed around a sound source in an anechoic chamber to determine the variation of the sound pressure with angle. These measurements are used in underwater source calibrations, in loudspeaker and musical instrument studies, etc. The disadvantage is that the measurements must be made in the farfield which for large sources or low frequency sources may lie a considerable distance from the source, beyond the size of any available anechoic chamber. There are other techniques which use measurements in the nearfield on cylindrical or spherical surfaces to calculate the farfield directivity. For these measurements a small anechoic chamber is sufficient. The method of the present invention for obtaining the farfield directivity is related to the nearfield techniques and fully retains their advantage.

Measurement of the nearfield vector intensity is currently receiving a great deal of attention in acoustics, and various measurement techniques have been used. U.S. Pat. No. 3,364,461 to W. J. Trott discloses a large planar array of transducers the sensitivities of the individual elements of which are shaded to produce a constant, plane wave near-field extending over the aperture of the array. The shading is such that the sensitivities of the elements increase from the extremeties toward the center of the array according to the coefficients of a summed binomial probability distribution function. While this system affords near-field measurements over a large aperture, and the simultaneous outputs of the elements are integrated to provide some useful response and directivity characteristics of a transducer source, it is subject to the disadvantage of relatively fixed shading values, and is lacking in ability to resolve the individual radiating features of a complex source. In another technique, two closely-spaced microphones are moved in an imaginary surface enclosing a sound source, measuring both the sound pressure and its gradient. From such measurements one component of the vector intensity may be calculated. By scanning over a surface one can determine the average radiated sound power. This technique is limited because coherent measurements can be made only in a small area, and the results to not reveal the complicated nature of the intensity vector field in the vicinity of the source and in the transition region between the source and farfield. There is a further error due to the finite separation of the microphones. A further common intensity measurement technique is similar to the two-microphone technique but uses an accelerometer mounted to the source in place of the second microphone. The accelerometer determines the surface normal component of the pressure gradient and hence only determines the normal component of the intensity. It suffers from the same disadvantages as the two-microphone technique in addition to being time-consuming for large or complicated sources.

The surface velocity or modal pattern is usually determined by mapping the surface with an accelerometer, but like the second intensity measurement technique, this has the disadvantage of being time-consuming. A non-contact method of determining the surface velocity involves optical holography. This technique, however, requires highly specialized equipment and controlled laboratory conditions, and cannot be used to study large areas.

The conventional method of measuring the total radiation sound power is to measure the sound level generated by the source in a reverberant room. The practical disadvantage here is the requirement that the measurements be made in a well characterized reverberant room. Furthermore, the assumptions which must be made about the statistical nature of the room are invalid at low frequencies, which is the regime for many relevant noise sources.

In summary, the determination heretofore of all of the desired properties of a sound source and field using conventional methods has required more than one technique and thus has been involved and time-consuming. Furthermore, each technique suffers from some fundamental limitation.

Now, a large fraction of the important applications for acoustic radiation research mentioned earlier involve low frequency, long wavelength sound radiation, and it is usually assumed in the field of holography that the spatial resolution of a reconstructed image is limited by the wavelength of the radiation. Because of this, acoustical holography has been rejected heretofore as a means of precisely locating and quantifying low frequency sound sources. However, the wavelength resolution limitation is not intrinsic to the fundamental theories of holography but rather is due to experimental limitations which are present in optical holography but are not necessarily present in acoustical holography.

SUMMARY OF THE INVENTION

With all the foregoing in mind, it is a principal object of this invention to provide an improved method and apparatus for analyzing and measuring the acoustic radiation properties of sound sources.

A further and important object of the invention is to provide a system for holographic reconstruction of a complex sound source and which can produce high resolution, substantially non-wavelength limited, imaging of such sound sources.

Yet another object is to extend the reconstruction process so that the single measurement of the sound pressure in the hologram plane is sufficient to yield not only the source sound pressure, but also the particle velocity (which in turn can yield the modal structure of a vibrating surface), the farfield radiation pattern, the total radiated power, and most importantly the vector intensity field.

As another object, the invention aims to provide a novel and useful system of the foregoing character and wherein the results can be rapidly generated and displayed in perspective on a color TV monitor, or on a stereoscopic display in three dimensions.

Still another and important object of the invention is to provide a novel apparatus and non-contact method that yields the complete particle velocity vector field which, when evaluated at a physical surface, yields the surface velocity amplitude and phase over a large area.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 4c is a graphic illustration of a holographic reconstruction of intensity characteristics of the source represented in FIG. 4a.

DESCRIPTION OF THE PREFERRED EMBODIMENT

Briefly, the present invention involves the recording of sound pressure amplitude and phase with a plane array of microphones, then reconstructing the desired acoustic properties digitally with an on-line computer, and finally displaying the results with computer graphics.

Figure 1:
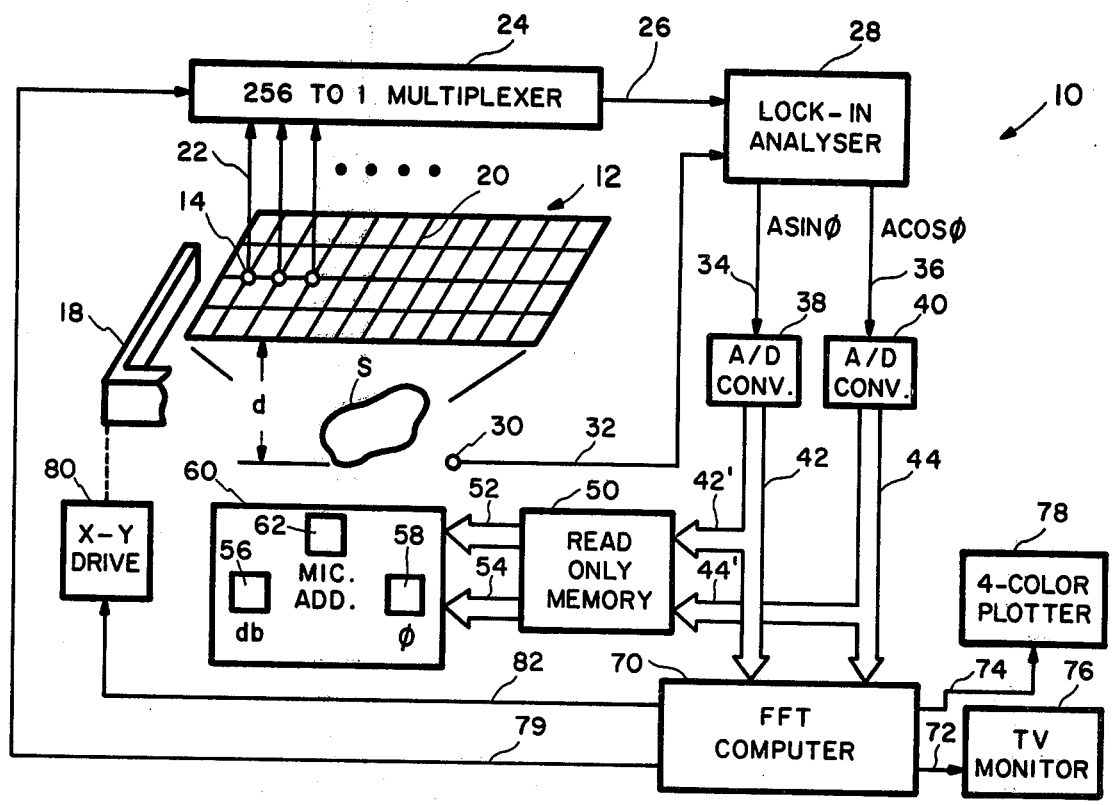
FIG. 1 is a diagrammatic illustration, in block form, of a system embodying the invention.

Referring now to FIG. 1, a presently preferred experimental system for making holographic reconstructions of a sound source S is indicated generally at 10 and comprises a planar, microphone array 12 disposed in the near-field at a distance d from the source S so as to subtend a large solid angle. The microphone array 12 is made up of 256 dynamic, moving-coil microphones 14 spaced 20.3 cm (8 in.) apart, making a grid of 16×16 microphone elements. Low impedance (about 300 ohm) microphones 14 are preferred to eliminate the need for preamplifiers and because of their low cost. Their sensitivity is good in the frequency range of interest and their 1.0 cm diaphragm diameter provides sufficient onmidirectionality. The array consists of a frame 18 supporting sixteen parallel aluminum beams 20 of dimensions 325×5.1×0.325 cm (128×2×⅛ in.) each carrying sixteen microphones. The beams 20 are turned so that their smallest dimension faces the sound field in order to reduce the scattering effects of the beam.

A plurality of two conductor, shielded cables 22 are provided, each connecting a corresponding microphone 12 to a 256 channel to 1 channel multiplexer 24.

The multiplexer 24, later described in more detail with reference to FIG. 2, sequentially samples the outputs of the microphones 14 and provides a serialized and preamplified output 26 to a resolver or lock-in analyzer 28. A second or reference input to the analyzer 28 is derived from a reference microphone 30 disposed adjacent the source S and is applied as shown by line 32. The analyzer 38 comprises conventional phase-sensitive means responsive to the reference signal on line 32 and the microphone signal on line 26 to provide DC output signals proportional to the in-phase and the quadrature components, $A \sin \phi$ and $A \cos \phi$, respectively, of the pressure amplitude A at each microphone when sampled by the multiplexer. These DC or analog output signals of the analyzer 28 are represented by lines 34 and 36. The outputs 34 and 36 are converted to binary digital form by 8-bit analog to digital converters 38 and 40, the digital outputs 42 and 44 of which are applied to an addressable memory storage 46, and also to an externally programmable read only memory 50 as shown at 42' and 44'.

The read only memory 50 converts the digital amplitude and phase read-outs for each microphone 14 to BDC code outputs 52, 54 for generating 7-segment LED numerical displays 56, 58 out of phase and amplitude on a front display panel that also displays at 62 the address of the microphone for which the displayed data is pertinent.

The accessible memory storage 46, provides the amplitude and phase data, as shown by lines 64, 66 to a computer 70, conveniently a Model PDP-11/34, of Digital Equipment Corporation, Maynard, Mass. Computer 70 performs predetermined computations on the amplitude and phase data for digitally reconstructing the desired acoustic properties, and for carrying out computer graphic programs to provide corresponding outputs 72, 74 for driving display, recording, or other utilization means. In this example, the displays comprise a T.V. monitor 76 and a 4-color plotter 78. Also, in the preferred embodiment being described, the computer 70 is programmed to control the switching or sampling of the multiplexer 24 via line 78, and a two axis drive 80 via line 82. The drive 80 indexes the array 12 in say, 2 inch increments in a 4×4 pattern to expand the data points to that of a 64×64 array.

Figure 2:
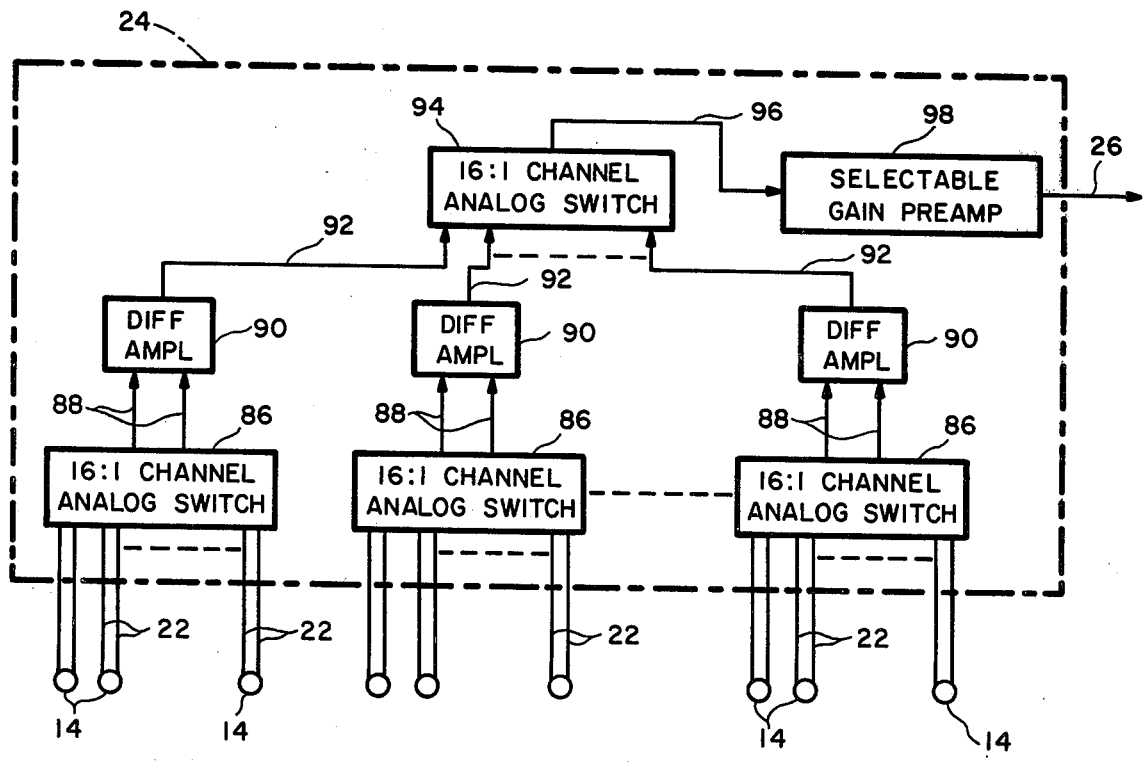
FIG. 2 is a diagrammatic illustration, in block form, showing the multiplexer portion of the system of FIG. 1 in greater detail.

Referring now to FIG. 2, the multiplexer 24 comprises a plurality of 16:1 channel analog switches 86, one for each of the sixteen microphone support beams. These switches may each conveniently comprise an RCA type CD4067 24 pin integrated circuit. Each of the switches 86 receives the inputs via lines 22 of the 16 microphones 14 on the respective support beam. The switches 86 have their respective outputs applied as shown by lines 88 to a like plurality of differential amplifiers 90. The amplifiers provide a 40 db boost and a high common mode rejection of extraneous signals picked up by the microphone cables 22. The differential amplifiers 80 have their outputs coupled, as shown by lines 92, to a final 16:1 channel analog switch 94. The output of the latter switch is fed via line 96 to a commercial preamplifier 98 of selectable gain for amplification of the serialized microphone signal samples as the output 26 of the multiplexer to the analyzer 28.

DISCUSSION OF THEORY

To derive the theory underlying nonwavelength-limited imaging, one first assumes a monochromatic source region (radiating with a wavelength $\lambda$) located to one side of an infinite plane I defined by $z=z_I$. From Green's theorem, the sound pressure amplitude and phase in the plane I [represented by the complex quantity $P_I(x',y')$] can be used to calculate exactly the sound field P at any field point (x,y,z) to the side of the plane away from the sources ($z>z_I$):

$$P(x,y,z) = \int\int P_I(x',y')G(x-x', y-y', z-z_I)dx'dy' \quad (1)$$

where $$G(x,y,z) = -\frac{1}{2\pi}\frac{\partial'}{\partial\alpha}\left[\frac{e^{i\frac{2\pi}{\lambda}\sqrt{x^2+y^2+\alpha^2}}}{\sqrt{x^2+y^2+\alpha^2}}\right]_{\alpha=z} \quad (2)$$

Physically, eq. (1) represents forward propagation of sound away from the sources.

If one now restricts the field point to lie in a second plane H defined by $z=z_H=z_I+d$, then eq. (1) becomes a two-dimensional convolution integral which can be inverted using the convolution theorem. Defining $P_H(x,y)=P(x,y,z_H)$ and $G_d(x,y)=G(x,y,d)$, and letting $\hat{f}(k_x,k_y)$ denote the two-dimensional Fourier transform of $f(x,y)$, we have from eq. (1): $\hat{P}_H(k_x,k_y)=\hat{P}_I(k_x,k_y)\hat{G}_d(k_x,k_y)$. The transform $\hat{G}_d$ is found analytically $$\hat{G}_d(k_x, k_y) = \begin{cases} \exp\left[id\sqrt{\left(\frac{2\pi}{\lambda}\right)^2 - k^2}\right] & k < \frac{2\pi}{\lambda} \\ \exp\left[-d\sqrt{k^2 - \left(\frac{2\pi}{\lambda}\right)^2}\right] & k > \frac{2\pi}{\lambda} \end{cases} \quad (3)$$

where $k^2=k_x^2+k_y^2$. It should be noted that $\hat{G}_d$ for $k<2\pi/\lambda$ represents the radiation of sound into the farfield, and $\hat{G}_d$ for $k>2\pi/\lambda$ represents the rapid exponential decay of the nonradiating nearfield of the sources, composed of evanescent waves.

Dividing the expression for $\hat{P}_H$ by $\hat{G}_d$ and taking the inverse Fourier transform (indicated by $F^{-1}$) we have $$P_I(x,y) = F^{-1}\{\hat{P}_H(k_x,k_y)[\hat{G}_d(k_x,k_y)]^{-1}\}. \quad (4)$$

Thus knowledge of the sound pressure in the H (hologram) plane can be used to deduce exactly the pressure in the I (Image) plane. If the sound sources are reasonably co-planar, then the plane I is made to coincide with the source plane for the reconstruction. How the technique may be extended for non-planar sources is discussed later.

Equation (4) differs from an expression representing optical holography in that $P_H$ contains amplitude as well as phase information, and more importantly, $\hat{G}_d^{-1}$ contains an exponentially increasing part for $k>2\pi/\lambda$ which takes the strongly decayed (but nonzero) evanescent wave components and restores them to their values in the image plane. Physical reconstruction methods (e.g., those using coherent light) must use forward propagating waves, which would be represented by $\hat{G}_d^*$, the complex conjugate of $\hat{G}_d$. This "propagator" retains the exponentially decaying part, and for $d>\lambda$, the decay is so rapid that essentially all of the information for $k>2\pi/\lambda$ is lost, and without these high spatial frequencies the image resolution is limited. In order to have no such resolution limit, eq. (4) must be evaluated numerically. However, it is then necessary that $P_H$ faithfully represent the evanescent wave information. In optical holography the wave lengths are so short that the hologram is necessarily recorded many wavelengths from the sources with the result that the evanescent wave amplitudes fall well below the noise level of the hologram recording medium. Thus if eq. (4) were used, the exponentially increasing part of $\hat{G}_d^{-1}$ would yield meaningless results. In order to use eq. (4), the hologram must be recorded sufficiently close to the sources so that the evanescent wave information falls within the dynamic range of the detector. It can be shown that the resolution R (distance between two resolvable point sources) of the reconstruction is given by $$R = 20\pi/D\ln 10 d, \quad (5)$$

where D is the dynamic range of the recording medium in dB. Eq. (5) does not contain $\lambda$ and indicates that good resolution is obtained when d is small, that is, when the hologram is recorded as close as possible to the sources. For low frequency sound (or electromagnetic) radiation it is experimentally possible to have d sufficiently small so that $R<<\lambda$. Of course there are some applications of acoustical holography for which d is physically restricted to be so large that $R>\lambda$. However, this is not the case for the applications mentioned in the Background of the Invention.

There are other important advantages in having d as small as possible. If the hologram aperture is a few times larger than the extent of the sources, then a small d means that the hologram aperture will be subtending a very large solid angle (approaching $2\pi$ steradians) relative to the sources. The result is that nearly all of the angular spectral information about the sources is recorded in the hologram and a complete farfield radiation pattern may be deduced. Furthermore, if the sources are near the center of the hologram aperture, then most of the large amplitudes will be measured there and the edges of the hologram will record only small amplitudes. Thus for practical purposes the hologram appears infinite in extent with the information outside the real aperture contributing little. It should be noted that the angular spectral information is all that is necessary for the exact reconstruction. With the hologram close to the sources, the finite aperture has negligible effect on the results. The usual diffraction effects do not apply because the aperture is in the nearfield of the sources and images. Another finite aperture effect, "wrap-around," is also eliminated when the hologram plane is near the sources.

When d is small, both $P_H$ and $P_I$ are in the nearfield and it may seem that little would be gained in the reconstruction. However, experimental results show that a significant increase in clarity can be obtained even when $d \simeq 0.04\lambda$. More importantly, much more information (in fact everything) can be calculated from the nearfield measurement of $P_H$. Replacing $\hat{G}_d^{-1}$ with $\hat{G}_{d'}$ in eq. (4) yields the sound pressure at a distance $d+d'$ away from the sources; large $d'$ yields the farfield pressure. The expression for the particle velocity $\vec{u}$ in both the nearfield and farfield can be obtained by taking the gradient of the right-hand-side of eq. (4) and noting that $\partial/\partial z = -\partial/\partial d$ for the nearfield, and $\partial/\partial z = +\partial/\partial d'$ for the farfield. The nearfield $\vec{u}$ can be used to obtain the modal structure of a vibrating surface. The vector intentisy $\vec{S} = \frac{1}{2} \text{Re}(P\vec{u}^*)$ can also be calculated. The directivity pattern of the sources is found from $\vec{S}$ in the farfield. Of primary importance is the determination of $\vec{S}$ in the nearfield, because this is what images the true energy producing sources; the nearfield sound pressure (or its square) does not yield this information. (An example of this distinction occurs in the judging of the quality of a musical instrument by the musician and a farfield listener; the musician detects the nearfield pressure, whereas what reaches the listener is determined by $\vec{S}$.) Usually only radiation perpendicular to the source plane is of interest, so calculating $S_z$ is sufficient. The total power radiated and the source radiation resistance and reactance can also be determined. It is important to note that all quantities are found from the single measurement of $P_H$; the expressions for the quantities are simple and easily evaluated by computer.

In the presently preferred experimental system 10, $P_H$ is sampled at discrete points $(x_i, y_j)$ in a square lattice with lattice constant $a = x_i - 1$. From the Nyquist sampling theorem, $\pi/a$ must be larger than the maximum wavenumber $k_{max} = (k_x^2 + k_y^2)^{\frac{1}{2}}$ for nonzero $\hat{P}_H(k_x, k_y)$. Although the source field may produce any size $k_{max}$, the finite dynamic range of the recording medium and the exponential decay of the nearfield limit the maximum detectable wavenumber to $\pi/R$, where R is given by eq. (5). Because of various measurement errors, it may be desirable to oversample. Thus a $<20\pi d/D \ln 10$; a useful estimate is $a \sim R/2 \sim d/2$. It will be understood that the discrete sampling of $P_H$ may be done with a scanning microphone, a microphone array, or a scanning array. Accordingly, the term hologram array will refer to the lattice of sound pressure measurement points. With $P_H$ sampled discretely, eq. (4) may be evaluated in a computer such as 70 with a Fast Fourier Transform (FFT) algorithm, thereby effecting greatly reduced processing time.

Figure 3A:
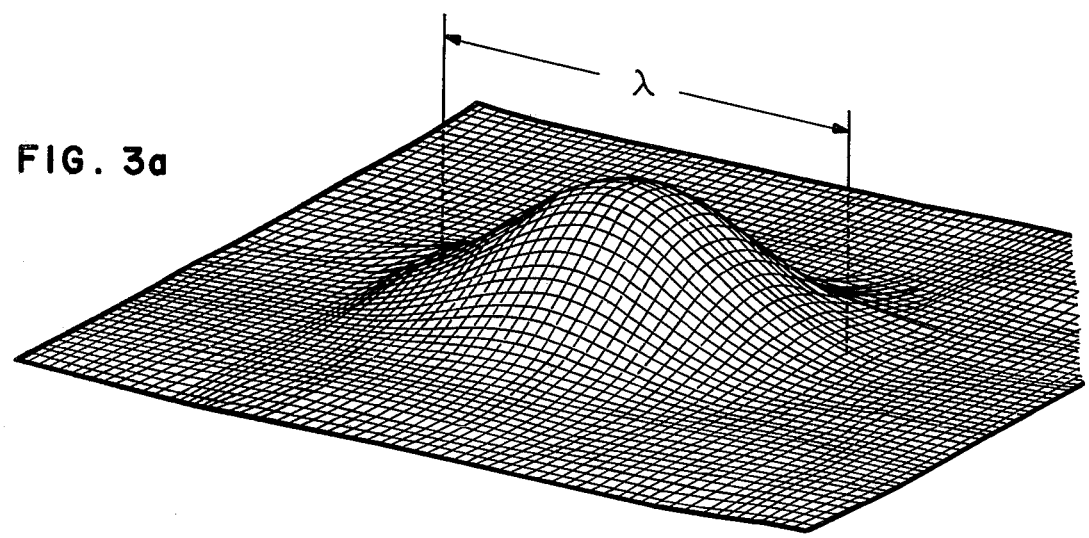
FIG. 3a is a graphic illustration of a holographic reconstruction of two adjacent point sources, using conventional processing.

As an example of operation of the method and apparatus, the invention has been operated using as sources two small unbaffled speakers (5 cm diameter) mounted 20 cm apart. The two speakers were driven in phase at 220 Hz, corresponding to a 156 cm wavelength in air; it was assumed that the speakers would act as point sources. The speakers were situated in a plane 10 cm away from the microphone array. FIG. 3a shows the result of trying to image the sources with the customary holographic technique, i.e., by assuming that no evanescent wave information is recorded. The resolution is clearly limited by the sound wavelenth $\lambda$. Furthermore, FIG. 3a represents the source intensity as being proportional to $P^2$, whereas the reconstruction of P would be even broader. With the customary technique, the reconstructed velocity at the source plane is nearly proportional to P and hence yields no significant information about the sources.

Figure 3B:
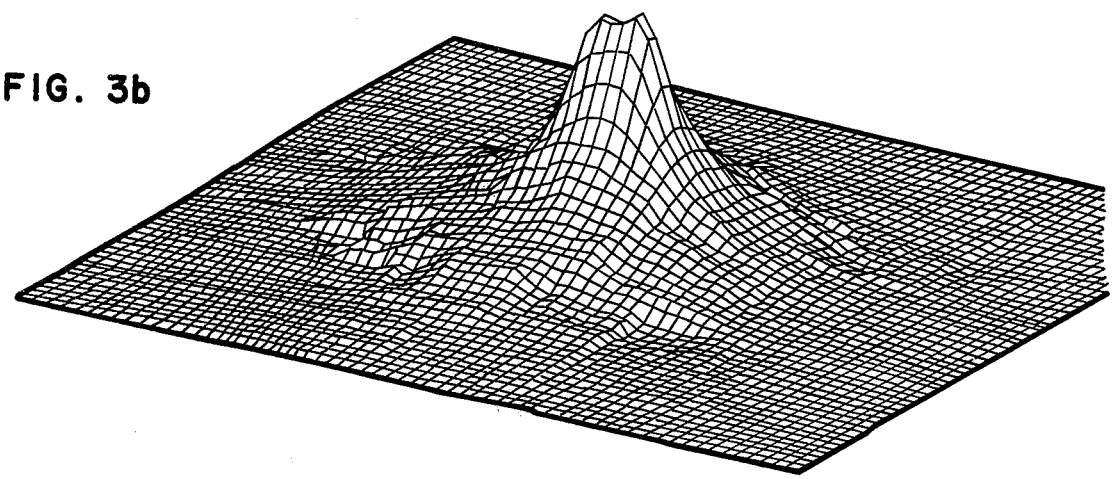
FIG. 3b is a graphic illustration of sound pressure amplitude in the hologram plane of the two adjacent point sources.
Figure 3C:
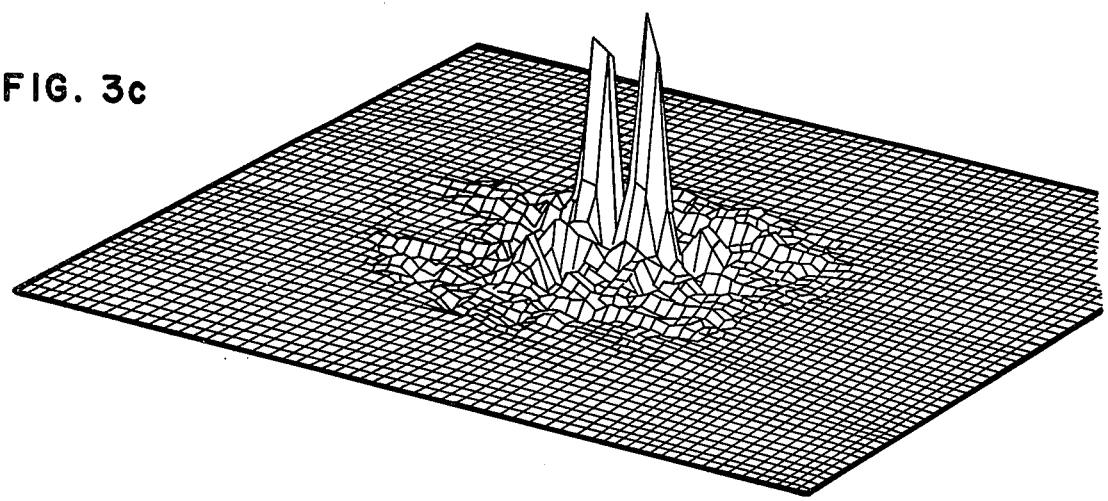
FIG. 3c is a graphic illustration showing holographic reconstruction of the same two point sources, using the present invention.

With FIG. 3a as a basis for comparison, and turning now to FIG. 3b, that figure shows the sound pressure amplitude $|P_H|$ measured by the array and giving recognition to the presence of evanescent waves. Even with the array as close as $0.06\lambda$ the sound field is significantly spread-out. It should be noted that most of the irregular structure in the data is due to the lack of calibration of the inexpensive microphones. This limited the recording system of the present embodiment to an effective dynamic range of only 30 dB. FIG. 3c shows the reconstruction of the intensity $S_z$ using eq. (4) and related expression. The two point sources are clearly resolved and could probably be resolved even if only 10 cm apart, as predicted by eq. (5). Reconstructions of the pressure and velocity are similar to FIG. 3c. The actual amplitude of the peaks depends on the details of the data processing.

Figure 4A:
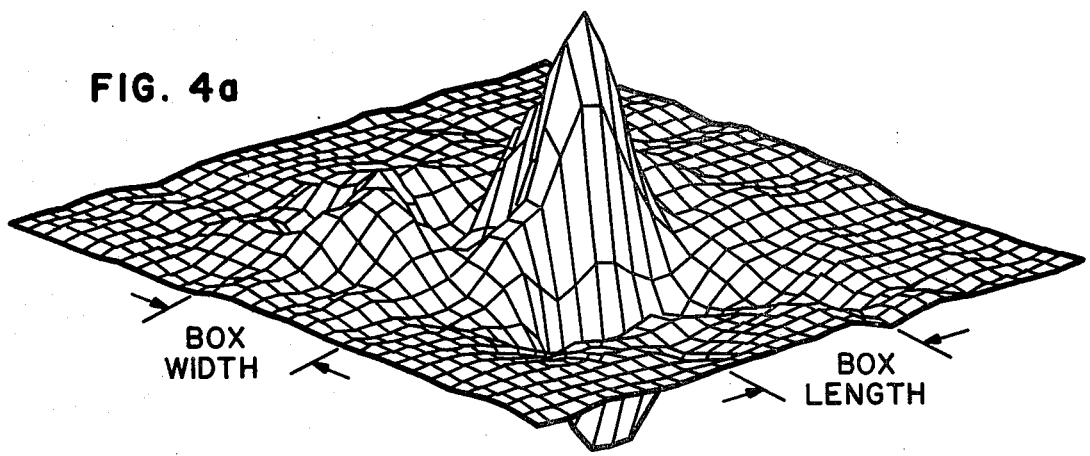
FIG. 4a is a graphic illustration of a holographic reconstruction of source sound pressure for a noise source consisting of a wooden box excited by a blower.
Figure 4B:
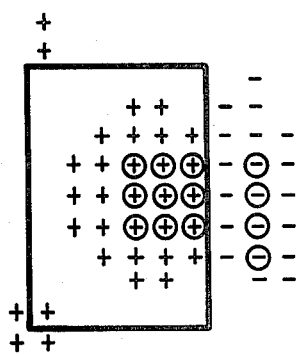
FIG. 4b is a diagrammatic top view of the box and its sound pressure and phase pattern.
Figure 4C:
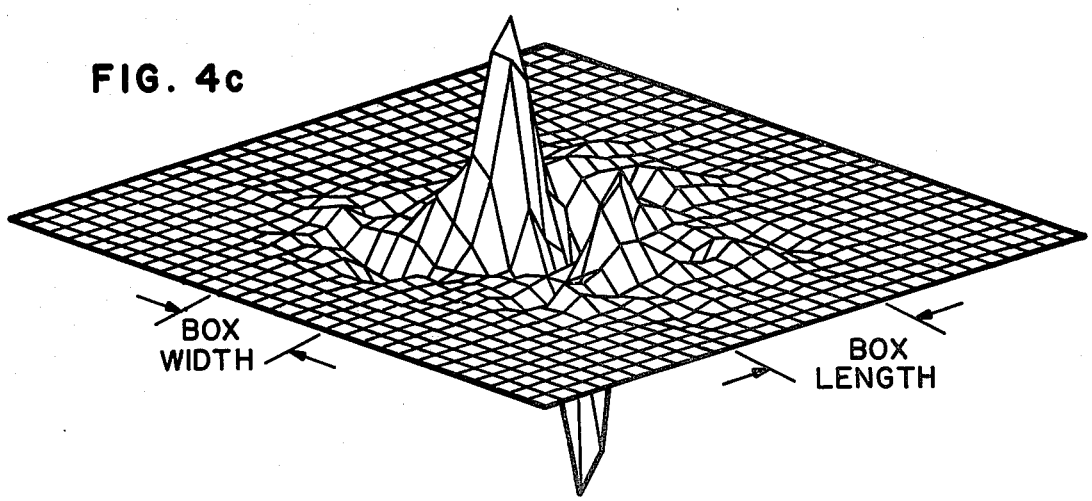
Figure 4D:
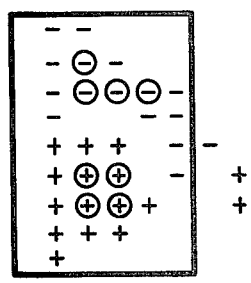
FIG. 4d is a diagrammatic top view of the box and its sound intensity pattern.

The invention has also been practiced with a noise source consisting of a blower mounted onto the side of a wooden box (31 cm × 41 cm × 29 cm) which was open on one side. A harmonic of the blower's rotational frequency, 120 Hz, excited a resonance in one side of the box. The separate microphone 30 monitored this frequency with a 50 Hz bandwidth and provided the reference for the hologram. It should be noted at this point that in the case, such as with the speakers, where the sound source is activated by a generated and controlled driving signal, the reference signal can be derived directly from the driving signal. The open side of the box faced the microphone array and was a distance of 10 cm from the plane of the array. FIG. 4a shows the reconstructed sound pressure in the plane of the box. FIG. 4b, representing a top view of the 3-D figure, shows an outline of the box and the relative amplitude and phase of the sound pressure. A dipolar pressure field generated by the resonating side of the box is clearly apparent. The large sound pressure amplitude near this side is observed by a nearfield listener. However, it is emphasized that this does not represent the energy producing sources. FIG. 4c shows the reconstructed intensity $S_z$ in the plane of the box. From FIG. 4d it can be seen that the source intensity pattern is quite different from that of the pressure. Inside the box there is a source ($S_z > 0$) and a sink ($S_z < 0$, corresponding to a region where the sound pressure and particle velocity have a phase difference greater than 90°). This asymmetry inside the box is caused by the presence of a block of styrofoam wedge across the width of the box which was used to dampen the resonance; the positive intensity peak is directly over the styrofoam block. There is no evidence of the styrofoam block in the pressure amplitude reconstruction. Apparently, surfaces which control the relative phase of the sound pressure and particle velocity determine the energy producing regions.

In addition to illustrating the significant information content of the intensity reconstruction, FIGS. 4a and 4c demonstrate the increase in resolution over conventional holography. The resolution of these views is $\sim 10$ cm, while the wavelength at 120 Hz is 286 cm, nearly the size of the hologram aperture.

The invention further contemplates the graphic holographic reconstruction of non-monochromatic sources, including transient as well as continuous sources, and those having both spatially coherent and incoherent components.

In theory, non-monochromatic sources [with a source field $\rho(\vec{r},t) \equiv \nabla^2 p - 1/C \partial^2 P/\partial t^2$] are handled by Fourier transforming in time. Then each Fourier component $\hat{\rho}(\vec{r},\omega)$ produces a sound field which can be analyzed as in the previous section treating monochromatic sources. The linear fields $\vec{P}(\vec{r},\omega)$ and $\vec{\mu}(\vec{r},\omega)$ can then be reconstructed and inverse transformed to obtain $\vec{P}(\vec{r},t)$ and $\vec{\mu}(\vec{r},t)$. Finally, suitably time averaged quantities such as intensity can be calculated. Thus, in theory, high resolution reconstructions of sound fields are possible for non-monochromatic sources.

Inasmuch as the time-Fourier transform requires time-series measurements in the hologram plane from time $t = -\infty$ to $t = +\infty$, which is, of course, impossible; time-series measurements must be made in a window from time $t_o$ to $t_o + T$. However if the sound sources are transient, having a finite duration $T_s$, and are under the control of the experimenter, then complete reconstructions are possible. It is only necessary that the sources be localized so that the effects of the finite hologram aperture are not significant, as discussed for monochromatic sources. Then the experimenter need only trigger the transient source at time $t_o$, and, at each array point (microphone) in the hologram plane, record a time-series of duration $T = T_s + L/C$, where L is the maximum distance between any two points in the source and hologram plane, and C is the sound velocity in the medium. Under these conditions the sound pressure measured in the hologram plane will be zero outside of the interval $t_o$ to $t_o + T$, and the finite-time Fourier transform will equal the infinite-time transform. Thus complete reconstructions of the sound field are possible. Because the time-series at each point in the hologram plane must be measured simultaneously, an elaborate electronics system is necessary; however, the point here is that there is no intrinsic theoretical limitation on the measurement. Furthermore, if the transient source is repetitive (i.e., each repetition of the transient produces an identical sound field), then the time-series for the points in the hologram plane may be recorded sequentially and this would not require an elaborate electronics system.

It the sound sources are not transient, but rather are continuous or not under the control of the experimenter, then holographic reconstructions are still possible, but now there is an intrinsic theoretical limitation due to the finite-time Fourier transform. A quantitative expression for a "worst case" limitation may be derived, the following assumptions being made:

(1) The sources must be localized so that the effects of the finite hologram aperture are not significant.

(2) One is only interested in the sound field in the time interval $t_o$ to $t_o + T$.

(3) One is only interested in the sound field in a volume V which includes the sources and hologram plane and which has a maximum linear dimension $L_v$. Note: the farfield radiation may be calculated, but the result will be meaningful only if suitable time averages of the field are stationary, i.e. they don't depend on $t_o$.

(4) The actual source spectrum $\hat{\rho}(\vec{r},\omega)$ has a finite bandwidth B. In order to calculate the theoretical limitation, consider a mathematical way of circumventing the limitation in which the actual source field $\rho(\vec{r},t)$ is replaced with a field $\rho'(\vec{r},t)$ which equals $\rho(\vec{r},t)$ in the time interval $t_o - L_v/C$ to $t_o + T + L_v/C$, but is zero outside this time interval. It should be clear that the source field $\rho'$ gives exactly the same sound field as $\rho$ in the volume V and in the time interval $t_o$ to $t_o + T$. For the source field $\rho'$, it is sufficient to record hologram time-series in the interval $t_o - 2L_v/C$ to $t_o + T + 2L_v/C$ in order to obtain unrestricted reconstructions as for transient sources. The problem, of course, is that constructing $\rho'(\vec{r},t)$ requires a priori knowledge of the actual source field $\rho(\vec{r},t)$. The question to address now is: what is the error incurred when measurements are made on the field produced by $\rho$ rather than on the field produced by $\rho'$. The measurements will involve the finite-time Fourier transform of the sound pressure in the hologram plane. At this point we are not interested in the spatial dependence of the field, so we let $P(t)$ and $P'(t)$ represent the maximum (or some suitable spatial average) of the sound pressure in the hologram plane due to the source fields $\rho$ and $\rho'$ respectively. The finite-time Fourier transform which is actually measured is $$A(\omega) = \int_{t_o - 2L_v/C}^{t_o + T + 2L_v/C} P(t) e^{-i\omega t} dt \tag{6}$$

This differs from the desired Fourier transform of $P'$ by an amount $$\delta A_{RET} \leq \int_{t_o - 2L_v/C}^{t_o - L_v/C} P(t) e^{-i\omega t} dt + \int_{t_o + T + L_v/C}^{t_o + T + 2L_v/C} P(t) e^{-i\omega t} dt. \tag{7}$$

The subscript RET referes to the time retardation error due to the finite time for the sound wave to traverse the distance $L_v$. If we apply the Schwarz inequality to the two integrals, we obtain $$|\delta A_{RET}| \leq \sqrt{\overline{P^2}} \; 2L_v/C \tag{8}$$

where $\overline{P^2} \equiv \frac{1}{T_L} \int_{t_o - 2L_v/C}^{t_o + T + 2L_v/C} P^2(t) dt \tag{9}$ and where $T_L = T \pm 4L_v/C$.

From Parseval's theorem we have that $$\overline{P^2} = \frac{1}{T_L} \int_{-\infty}^{\infty} |A(\omega)|^2 \frac{d\omega}{2\pi} \tag{10}$$

Recalling that the sound sources are bandlimited, we can define an average power spectral density by $$\overline{A}^2 = \frac{1}{B} \int_{-\infty}^{\infty} |A(\omega)|^2 \frac{d\omega}{2\pi} \tag{11}$$

We finally have for the maximum fractional error in $A(\omega)$ $$E_{RET}(\omega) \equiv \frac{|\delta A_{RET}|}{|A(\omega)|} \leq \frac{\overline{A}}{|A(\omega)|} \sqrt{\frac{B}{T_L}} \; \frac{2L_v}{C} \tag{12}$$

In noise measurements one is usually interested in frequencies where $|A(\omega)|$ is a maximum, so that $\overline{A}/|A(\omega)| < 1$. Furthermore, if the high frequency components of the sources are random and are not of interest, then B can be reduced by passing the microphone signals through a low pass filter. At any rate, $E_{RET}$ may be made as small as desired by having T sufficiently large. Reasonable experimental values for B, $L_v$, and T give sufficiently small values of $E_{RET}$, as will be discussed subsequently.

The expression for $E_{RET}$ above is undoubtably a gross overestimate for most real noise sources. Better estimates of $E_{RET}$ depend on the statistical nature of the noise source.

Experimentally, the "worst case" source would require the simultaneous recording of the time-series at each hologram lattice point. That is, there must be a microphone at each lattice point and the microphones must be electronically processed in parallel. If the noise source is bandlimited, then the time-series may be sampled discretely at the temporal Nyquist rate. Each discrete time sample would consist of the sound pressure measurement throughout the entire hologram array and would be essentially a "snapshot" of the sound field in the hologram plane. The time-series data would represent a "film-strip" of the sound passing through the hologram plane. The reconstruction process may be thought of as the reversing of the direction of the film-strip in order to reconstruct the sound field.

The use of modern digital electronics makes it possible to construct a parallel processing system which would have an upper frequency limit of a few kilohertz and a frequency resolution of a few hertz. Such a system with "filmstrip" processing may be used to reconstruct the sound field of virtually any source.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A system for measuring characteristics of a sound source disposed substantially in a first predetermined plane and operative to radiate sonic energy with a propagation wavelength $\lambda$ out of said plane, said system comprising:

receiving means, presenting an array of receiving points to said source, for receiving said sonic energy at said points and generating electrical signals representative of the acoustic energy received at each of said points, said receiving means having a dynamic range D, and said array lying substantially in a second predetermined plane at a predetermined distance d from said first predetermined plane;

multiplexer means, responsive to said electrical signals, for sampling said signals from each of said points and generating a serialized output representative thereof;

reference means, for providing an electrical reference signal representative of said sonic energy in said first plane;

computer means, responsive to said serialized output and to said reference signal, for performing an inverse Fourier transform thereon; and said predetermined distance being less than about $0.04\lambda$, whereby said receiving means is responsive to evanescent waves of said sonic energy and said computer means provides output signals representative of a holographic reconstruction of a predetermined characteristic of said sound source with a resolution $R = 2 0 \pi / D \ln 10$ d.

2. A system as defined in claim 1, and further comprising:
    utilization means, responsive to said computer means output signals, for generating a graphic representation of said holographic reconstruction.

3. A system as defined in claim 1 and wherein:
    said predetermined distance is such that said array is disposed in the near-field of said source and presents an aperture that subtends a wide solid angle substantially approaching $2\pi$ steradians relative to said source.

4. A system as defined in claim 3, and further comprising:
    utilization means, responsive to said computer means output signals, for generating a graphic representation of said holographic reconstruction.

5. A system as defined in claim 4, and wherein:
    said reference means comprises a reference microphone disposed substantially in said first plane.

6. A system as defined in claim 5, and wherein:
    said array comprises a plurality of array microphones disposed in a reticulate pattern and corresponding to a like plurality of said receiving points.

7. A system as defined in claim 6, and wherein:
    said array comprises support means for holding said array microphones in said pattern;
    said system further comprising drive means for effecting translational relative movements between said array and said source, whereby said receiving points of said array are multiplied.

8. A system as defined in claim 7, and wherein:
    said drive means comprises means responsive to indexing signals from said computer means for effecting said movements in predetermined timed relation to sampling of each electrical signals by said multiplexer means.

9. A method for effecting a non-wavelength limited holographic reconstruction of a source emanating acoustic wave energy substantially from a source field plane with a propagation wavelength $\lambda$, said method comprising the steps of:

detecting said acoustic wave energy, including evanescent waves thereof, at a plurality of discrete points at a predetermined distance d from said source, said predetermined distance d being less than $0.04\lambda$, so as to provide analog detection signals representative of said acoustic energy including said evanescent waves thereof;

providing a reference signal corresponding to said acoustic wave energy in said source field plane;

combining said reference signal and said detection signals and resolving a resulting difference signal into direct and quadrature components for each of said discrete points;

converting said direct and quadrature components into digitized form;

digitally performing Fourier deconvolution on said digitized direct and quadrature components to deduce reconstruction signals representative of characteristics of said radiating source in said source field plane.

10. The method according to claim 9, and wherein:
said step of detecting is performed sequentially at said discrete points; and
said method further comprises a step of multiplexing said analog detection signals into serial form.

11. The method according to claim 9, and wherein:
said method further comprises the step of converting said reconstruction signals to a computer graphic display of said source characteristic.

12. The method according to claim 9, and wherein: said method further comprise a plurality of detection steps performed substantially simultaneously at each of said points.

13. The method according to claim 9, and wherein:
said method further comprises sequential detecting steps at said points, the detection step at each point being done over a predetermined time period correlated to a selected repetitive characteristic of said source, whereby a filmstrip effect is obtained for that characteristic.

* * * * *